(12) United States Patent
Suzuki et al.

(10) Patent No.: US 7,638,712 B2
(45) Date of Patent: Dec. 29, 2009

(54) PROTECTOR

(75) Inventors: Mitsuharu Suzuki, Utsunomiya (JP);
Shinji Sonda, Utsunomiya (JP); Yuuji Ishimura, Wako (JP); Takashi Ihara, Wako (JP)

(73) Assignees: Yazaki Corporation, Tokyo (JP);
Honda Motor Co., Ltd., Tokyo (JP)

( * ) Notice: Subject to any disclaimer, the term of this patent is extended or adjusted under 35 U.S.C. 154(b) by 334 days.

(21) Appl. No.: 11/829,368

(22) Filed: Jul. 27, 2007

(65) Prior Publication Data
US 2008/0023223 A1    Jan. 31, 2008

(30) Foreign Application Priority Data
Jul. 28, 2006  (JP) .............. 2006-205703

(51) Int. Cl.
*H02G 3/04* (2006.01)
(52) U.S. Cl. .................. 174/72 A; 174/72 C; 174/135; 174/97; 174/68.1; 174/481; 439/207; 248/68.1; 411/182; 24/453
(58) Field of Classification Search .............. 174/72 C, 174/72 A, 70 C, 135, 68.1, 97, 96, 20, 481; 439/207; 52/220.1, 220.5; 248/68.1, 74.1, 248/73; 411/182, 904; 24/453
See application file for complete search history.

(56) References Cited

U.S. PATENT DOCUMENTS

| 4,951,716 | A  | * | 8/1990 | Tsunoda et al. | ............. 138/162 |
| 6,971,816 | B2 | * | 12/2005 | Miyagawa et al. | .......... 403/397 |
| 7,485,808 | B2 | * | 2/2009 | Guthke et al. | ............. 174/72 A |
| 7,491,904 | B2 | * | 2/2009 | Villi | ........................... 174/481 |
| 7,514,630 | B2 | * | 4/2009 | Anderson | ................. 174/72 A |
| 7,534,965 | B1 | * | 5/2009 | Thompson | .............. 174/153 G |

FOREIGN PATENT DOCUMENTS

JP         984240 A      3/1997

* cited by examiner

*Primary Examiner*—Dhiru R Patel
(74) *Attorney, Agent, or Firm*—Morgan, Lewis & Bockius LLP (57) ABSTRACT

In a protector, a lock mechanism for a stay is provided at a protector body. The lock mechanism includes a stay abutment plate which is perpendicular to a direction of a normal line of the protector body, a boss for passing through a boss passage hole in the stay, and a lock piece portion for locking the stay. With this construction, the amount of retaining engagement of the lock piece portion can be increased without adversely affecting the moldability of a mold. As a result, the force of retaining of the protector can be enhanced, thereby avoiding a situation in which the protector is disengaged from the stay.

7 Claims, 14 Drawing Sheets

PROTECTOR

BACKGROUND OF THE INVENTION

1. Field of the Invention

This invention relates to a protector suitably used for installing a wire harness in a vehicle such as an automobile.

2. Related Art

Figure 13:
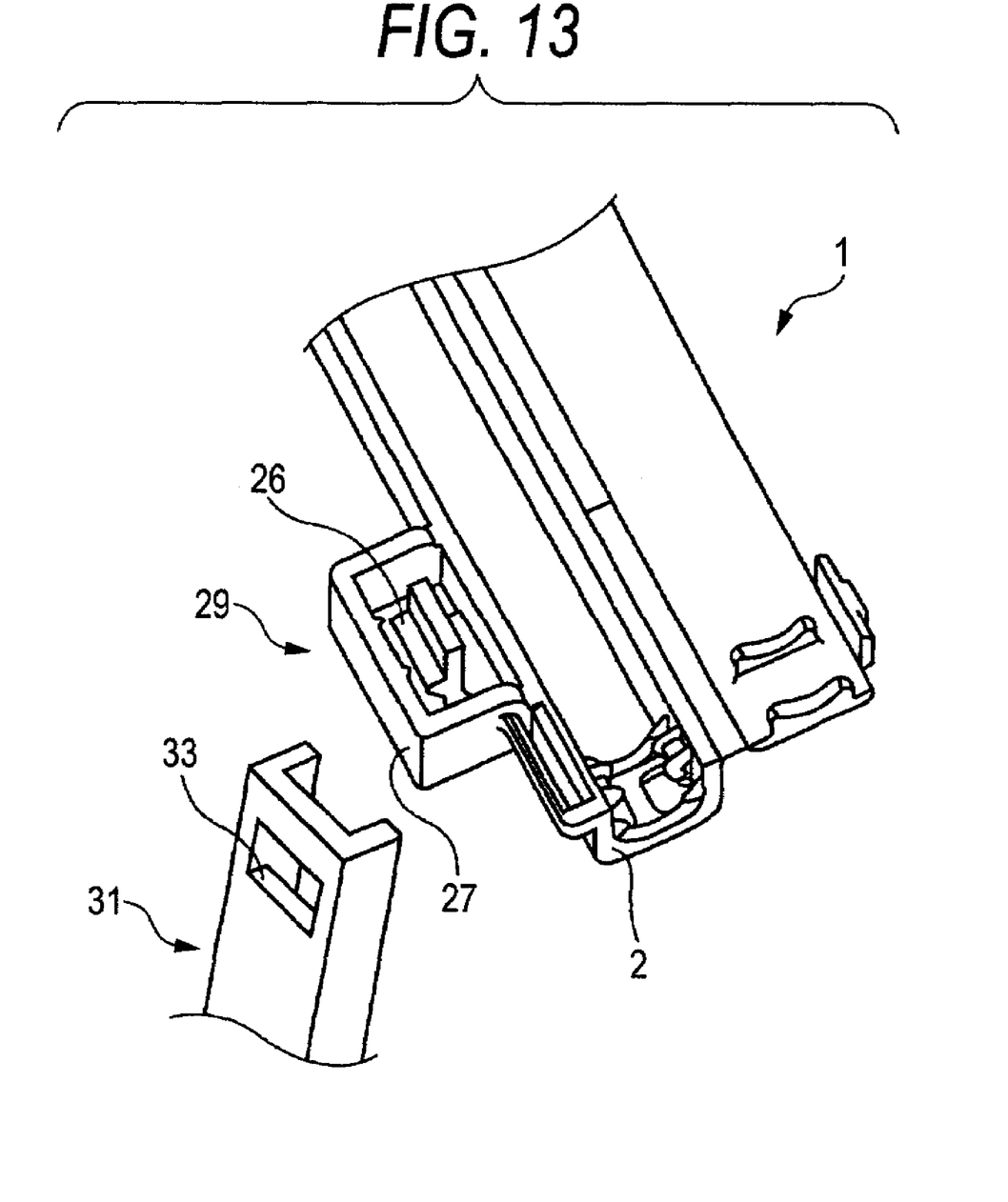
FIG. 13 is a perspective view showing a conventional protector.
Figure 14:
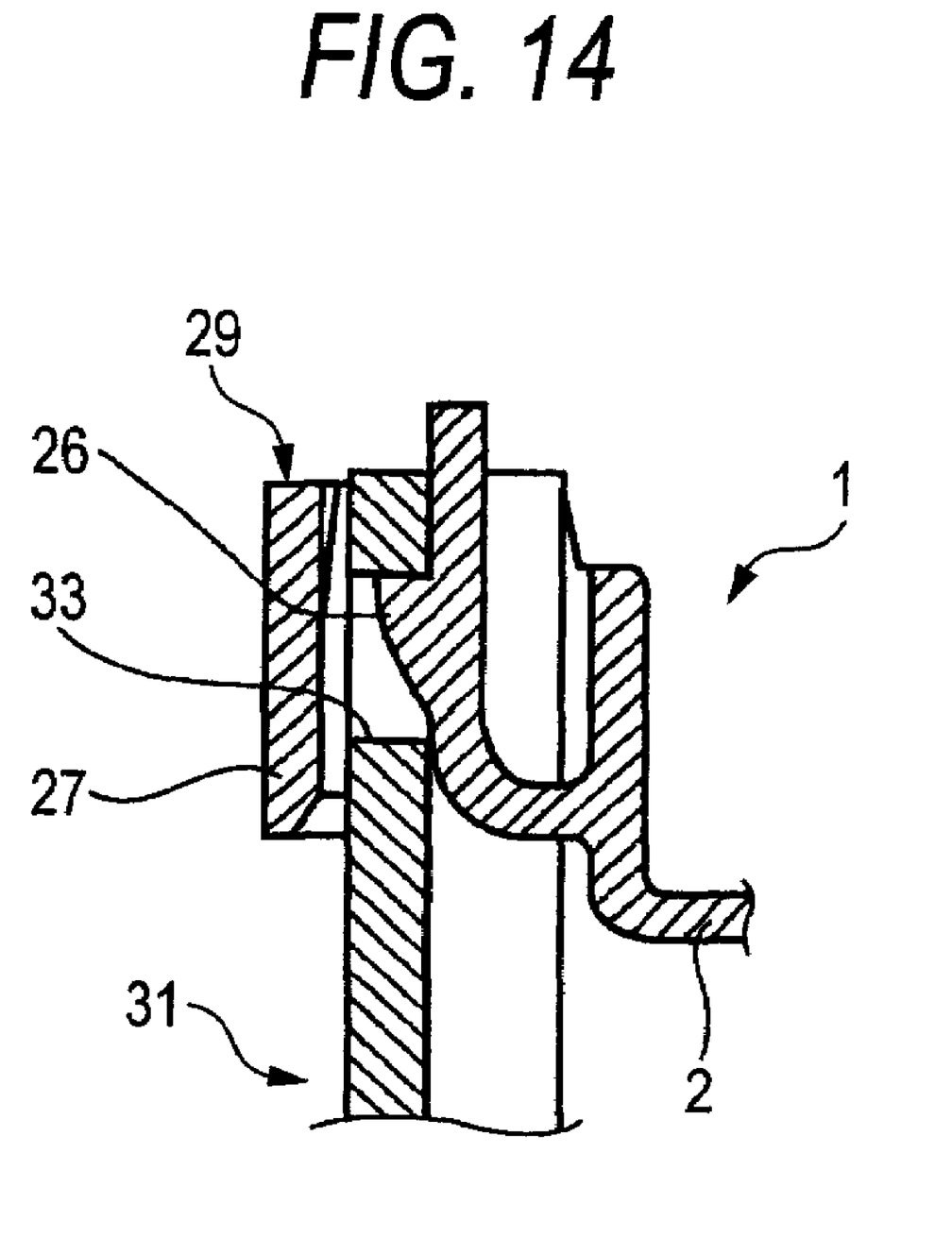
FIG. 14 is a cross-sectional view showing a condition in which the protector of FIG. 13 is attached to a stay.

FIG. 13 is a perspective view showing a conventional protector, and FIG. 14 is a cross-sectional view showing a condition in which the protector of FIG. 13 is attached to a stay.

With respect to protectors of this kind, there has heretofore been proposed an attaching method (hereinafter referred to as "slide method") in which the protector is slid to be engaged with a vehicle-side stay (see, for example, JP-A-9-84240 Publication). In this slide method, however, the protector can not be attached to the stay unless a sliding amount is not secured in a direction along a protector body.

Therefore, in order that a protector can be attached even when a sliding amount can not be secured in a direction along a protector body, there is proposed a method (hereinafter referred to as "insertion method") in which a vehicle fixing portion 29, having a frame portion 27 of a generally U-shape surrounding a retaining claw 26, is formed on a protector body 2 as shown in FIG. 13, and this vehicle fixing portion 29 is fitted onto a vehicle-side stay 31, so that the retaining claw 26 is fitted into a retaining hole 33 in the stay 31 as shown in FIG. 14, thereby fixing the protector 1 to the vehicle.

In this insertion method, however, when the protector 1 is to be fixed to the vehicle, the stay 31 must be passed through a gap between the retaining claw 26 and the frame portion 27 as shown in FIG. 14, and therefore there has been encountered a problem that the shape of the stay 31 is limited.

SUMMARY OF THE INVENTION

In view of the above circumstances, it is an object of this invention to provide a protector which can be attached even when a sliding amount in a direction along a protector body is not secured, and besides can avoid a situation in which the shape of a vehicle-side stay is limited.

According to the invention, there is provided a protector including a protector body and a lock mechanism for a stay provided at the protector body, the lock mechanism including a stay abutment plate which is perpendicular to a direction of a normal line of the protector body, a boss for passing through a boss passage hole in the stay, and a lock piece portion for locking the stay.

In the protector of the invention, the lock piece portion may have a retaining claw projecting toward the boss.

In the protector of the invention, the lock piece portion may have an engagement projecting portion projecting from the lock claw toward the boss.

In the protector of the invention, the engagement projecting portion may be formed at part of the retaining claw.

In the protector of the invention a crushable rib may be formed on an outer periphery of the boss.

In the protector of the invention a frame portion for snugly fitting to the stay may be formed around the boss.

In the protector of the invention, a crushable rib maybe formed on an inner periphery of the frame portion.

In the present invention, the amount of retaining engagement of the lock piece portion can be increased without adversely affecting the moldability of a mold. As a result, the force of retaining of the protector can be enhanced, thereby preventing the protector from being disengaged from the stay.

And besides, the shaking of the attached protector is suppressed, and therefore the force of retaining of the protector can be further enhanced.

DETAILED DESCRIPTION OF THE PREFERRED EMBODIMENTS

A preferred embodiment of the present invention will now be described with reference to the drawings.

First Embodiment

Figure 1:
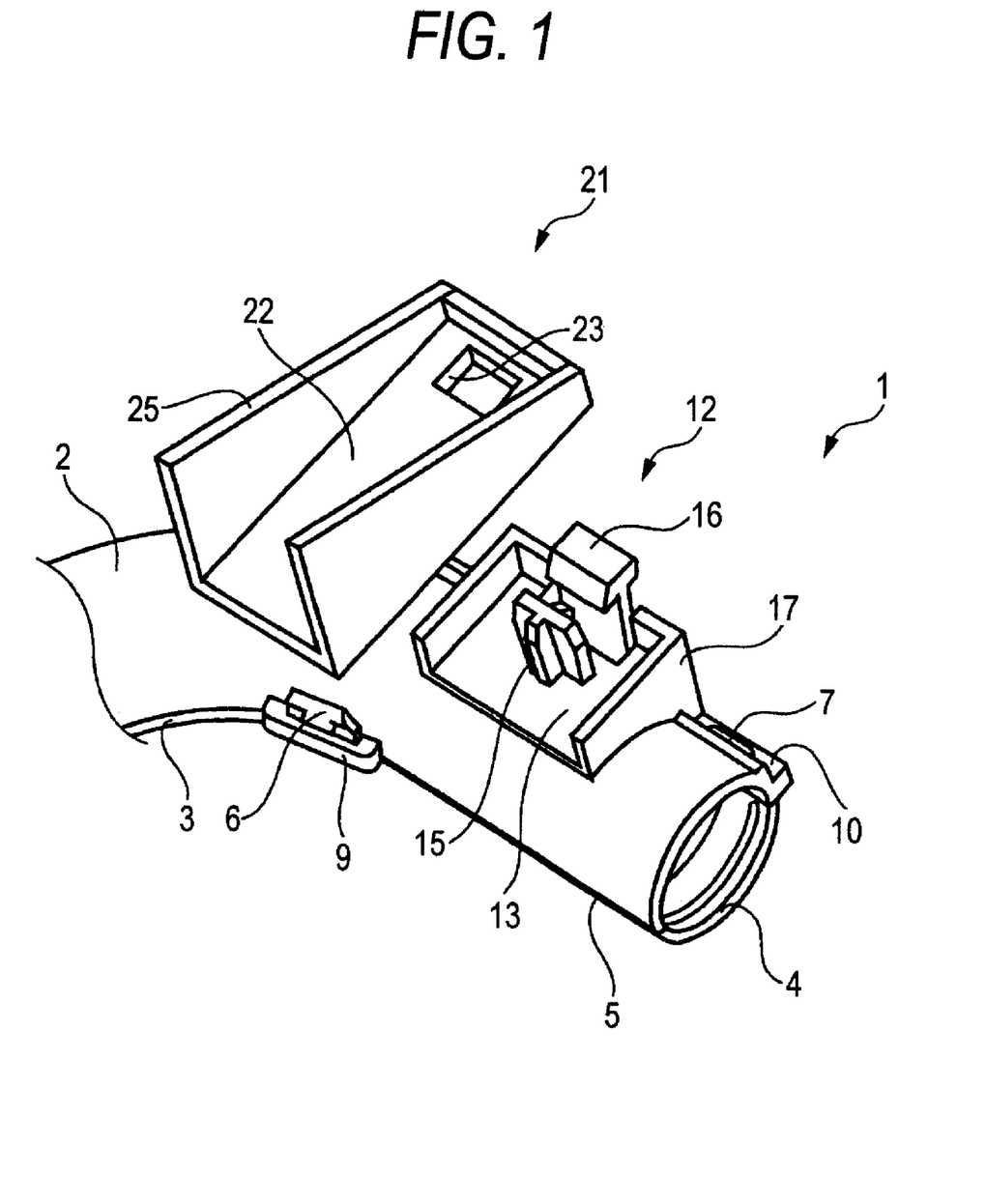
FIG. 1 is a perspective view showing a first embodiment of a protector of the present invention.
Figure 2:
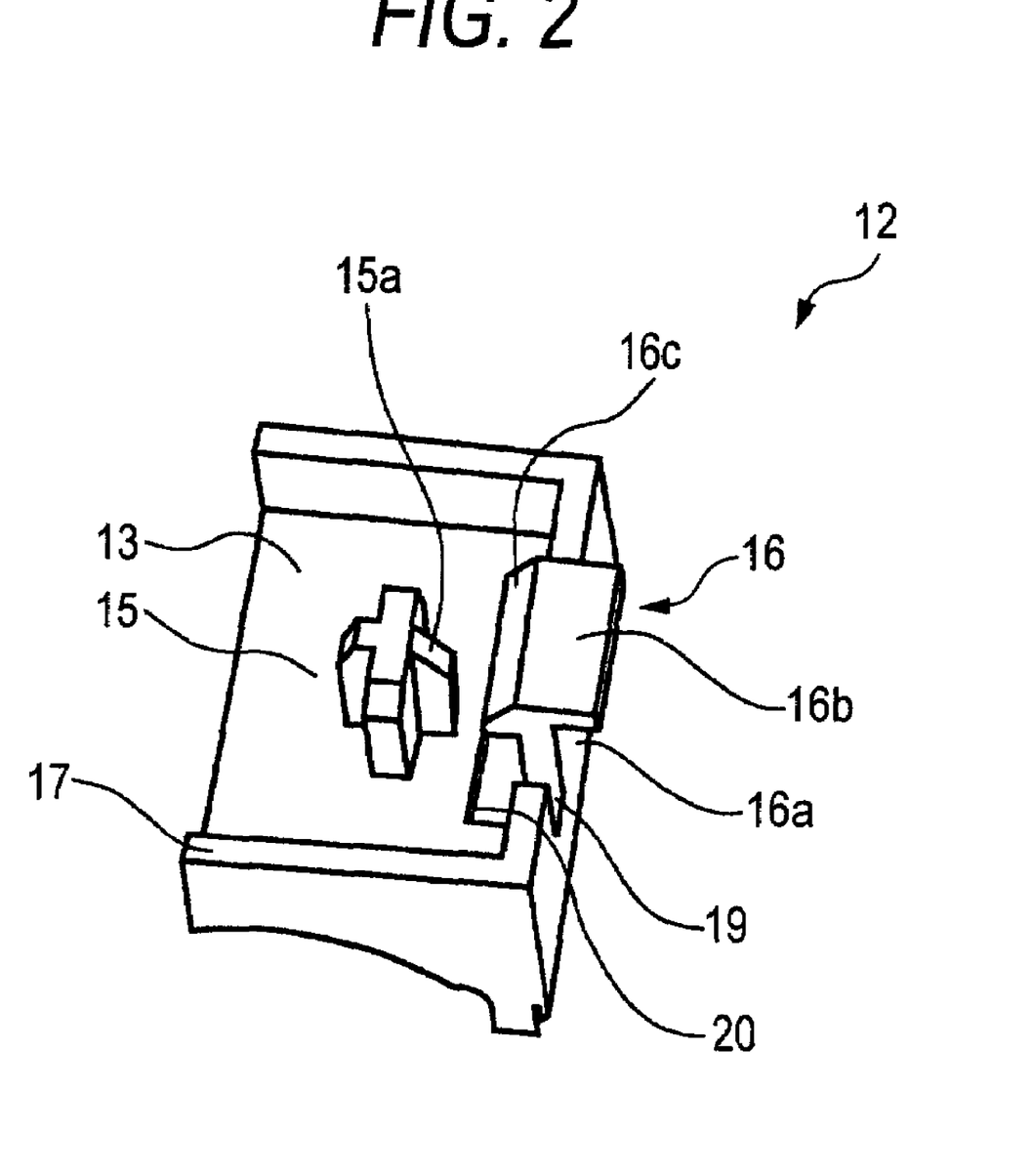
FIG. 2 is a perspective view of a lock mechanism of the protector of FIG. 1.
Figure 3:
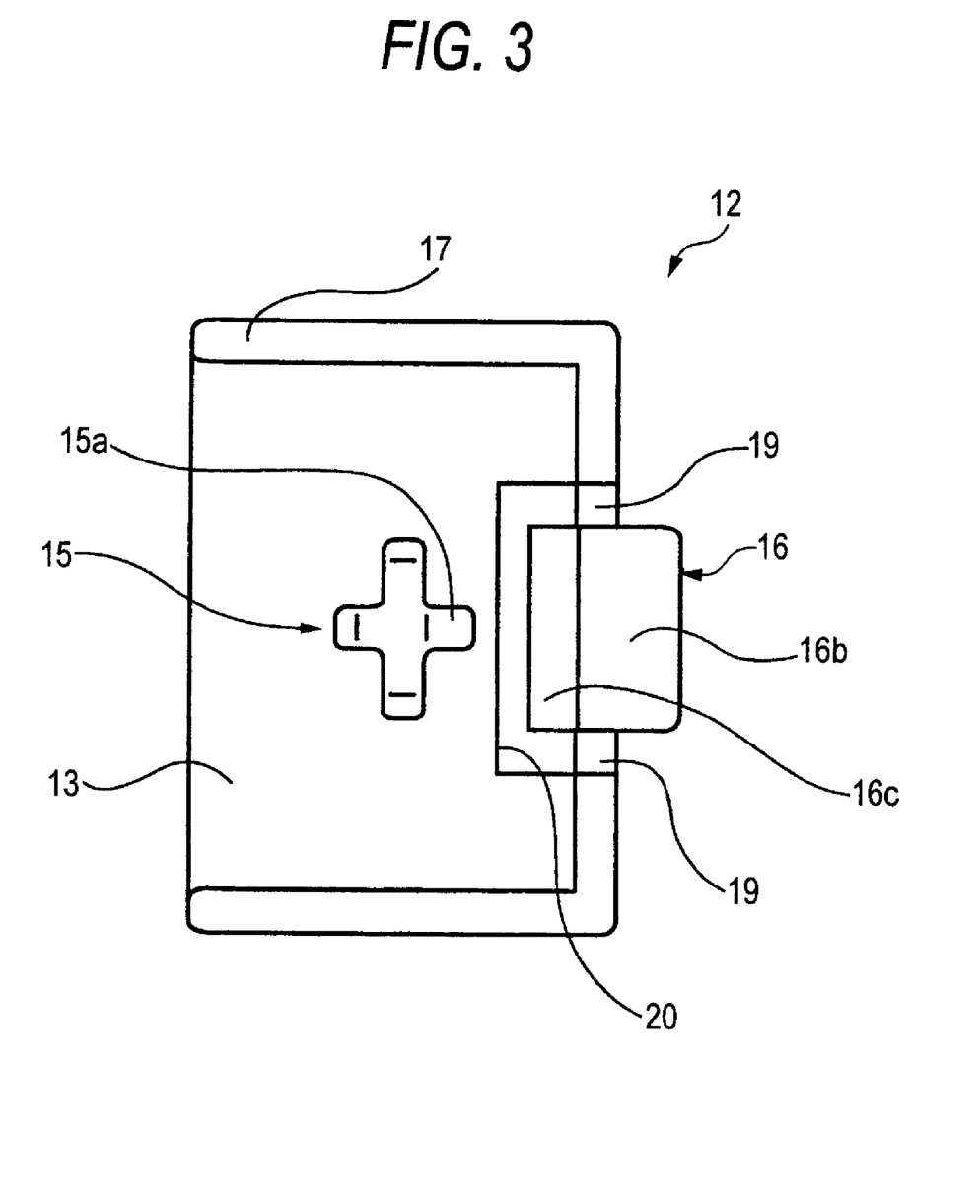
FIG. 3 is a plan view of the lock mechanism of FIG. 2.
Figure 4:
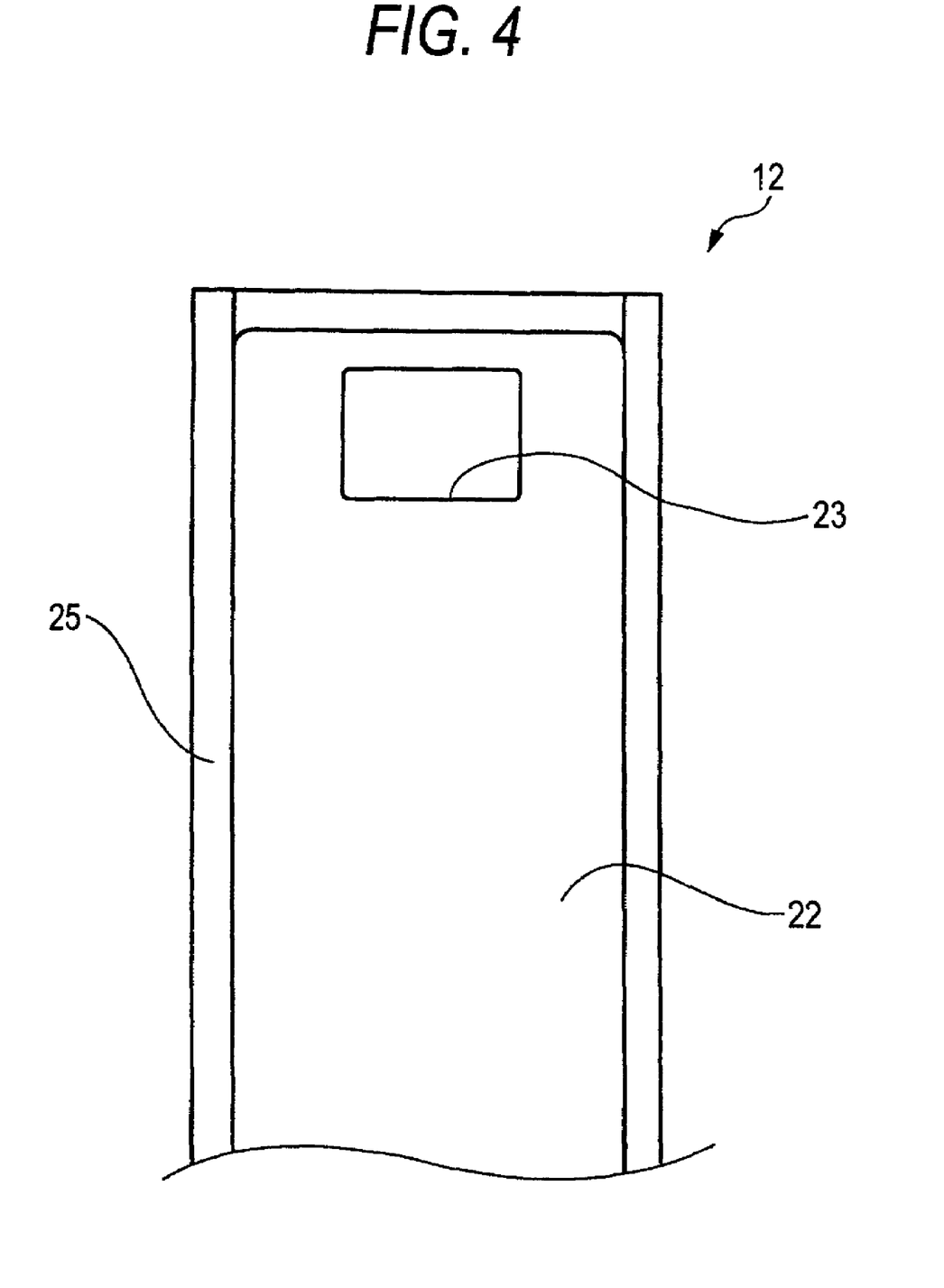
FIG. 4 is a plan view showing a vehicle-side stay.
Figure 5:
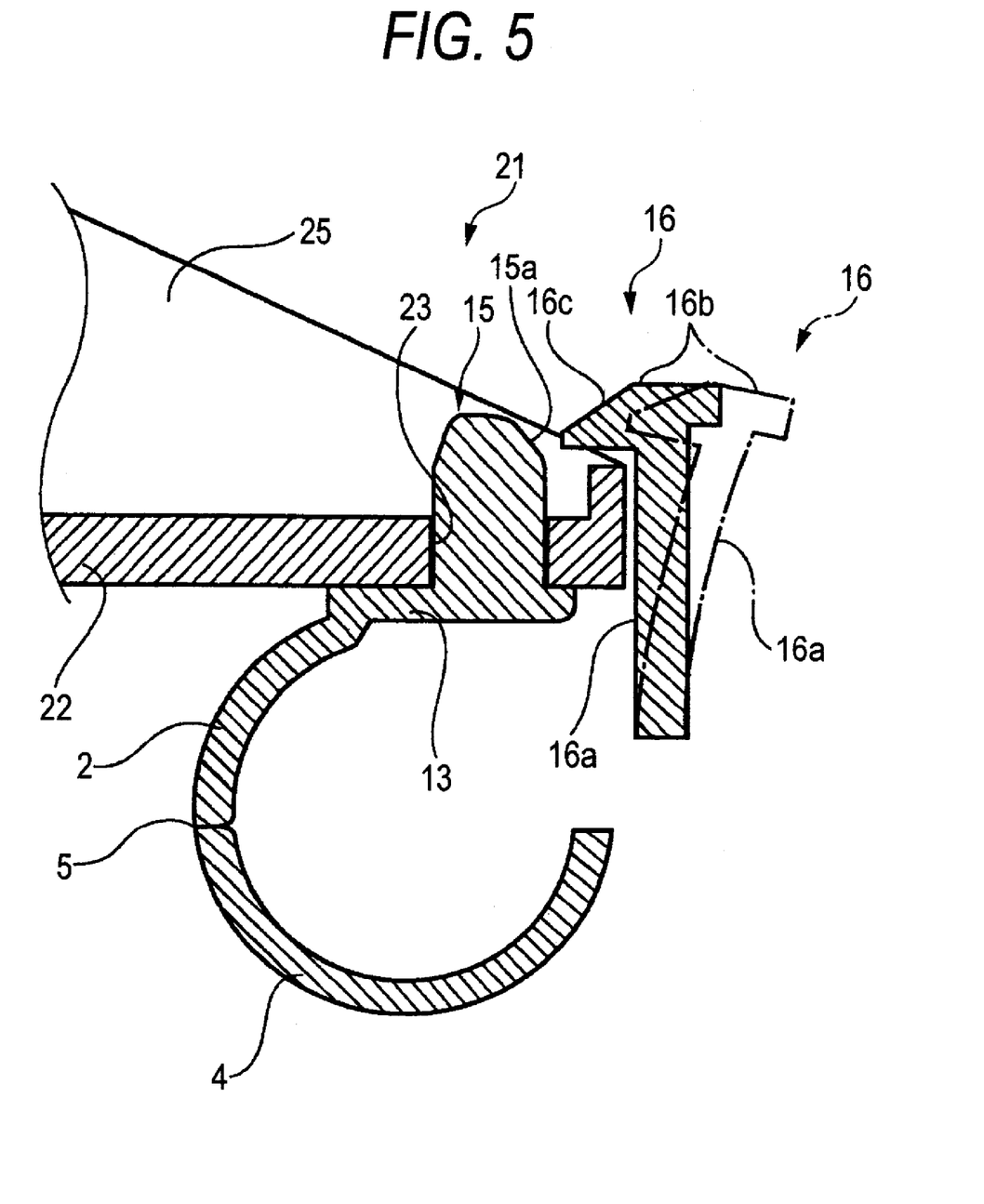
FIG. 5 is a cross-sectional view showing a condition in which the protector of FIG. 1 is attached to the stay.

FIG. 1 is a perspective view showing a first embodiment of a protector of the present invention, FIG. 2 is a perspective view of a lock mechanism of the protector of FIG. 1, FIG. 3 is a plan view of the lock mechanism of FIG. 2, FIG. 4 is a plan view showing a vehicle-side stay, and FIG. 5 is a cross-sectional view showing a condition in which the protector of FIG. 1 is attached to the stay.

The protector 1 is an integrally-molded product made of a synthetic resin such as polypropylene and polyethylene, and this protector 1 includes a protector body 2 of a curved trough-shape as shown in FIG. 1. A first lid member 3 of an arcuate trough-shape is pivotally connected to the protector body 2 through a hinge (not shown), and a plurality of engagement claws 6 are formed on the first lid member 3. A plurality of engagement piece portions 9 are formed respectively at those portions of the protector body 2 corresponding respectively to the engagement claws 6. Further, a second lid member 4 of a straight trough-shape is pivotally connected to the protector body 2 through a hinge 5, and a plurality of engagement claws 7 are formed on the second lid member 4. A plurality of engagement piece portions 10 are formed respectively at those portions of the protector body 2 corresponding respectively to the engagement claws 7.

The lock mechanism 12 is provided at the protector body 2 as shown in FIG. 1. As shown in FIGS. 2 and 3, the lock mechanism 12 includes a flat plate-like stay abutment plate 13, a boss 15 of a cross-shaped cross-section, a lock piece portion 16, a frame portion 17 of a generally U-shape, two grooves 19, and a rectangular mold removal hole 20. The stay abutment plate 13 is perpendicular to a direction of a normal line of the protector body 2. The boss 15 is formed in an upstanding manner at a generally central portion of the stay abutment plate 13, and the upstanding frame portion 17 is disposed around the boss 15 in a manner to surround the boss 15 on three sides. The lock piece portion 16 is integrally connected to the frame portion 17, and the two grooves 19 of a predetermined depth are formed respectively at opposite sides of the lock piece portion 16. Tapering surfaces 15a are formed at an upper end of the boss 15. The lock piece portion 16 has a retaining claw 16b formed integrally on an upper end of a wall-like support post 16a and projecting forwardly and rearwardly from the support post 16a. A tapering surface 16c is formed on an upper surface of the retaining claw 16b. Further, the mold removal hole 20 is formed vertically (in an upward-downward direction) through that portion of the stay abutment plate 13 disposed beneath the retaining claw 16b of the lock piece portion 16.

On the other hand, as shown in FIGS. 1 and 4, the vehicle-side stay 21 includes a flat plate-like stay body 22, and a boss passage hole 23 of a rectangular shape is formed through the stay body 22. Further, a flange 25 is formed on an outer peripheral edge of the stay body 22.

The protector 1 has the above construction, and the protector 1 is attached to the vehicle-side stay 21 according to the following procedure.

Namely, the protector 1 is moved relative to the stay 21 in a direction of a normal line of the protector body 2, and the boss 15 of the protector 1 is passed through the boss passage hole 23 in the stay 21. At this time, since the tapering surfaces 15a and the tapering surface 16c are formed respectively at the upper end of the boss 15 of the protector 1 and the upper end of the retaining claw 16b of the lock piece portion 16, the lock piece portion 16 is elastically deformed as indicated in an imaginary line in FIG. 5 while the retaining claw 16b is forcibly retracted rearward (away from the boss 15) by the stay 21, so that a gap between the lock piece portion 16 and the boss 15 increases. As a result, the boss 15 is smoothly guided into the boss passage hole 23, and is passed therethrough. Incidentally, the grooves 19 are formed respectively at the opposite sides of the lock piece portion 16, and therefore the required amount of elastic deformation of the lock piece portion 16 can be secured.

When the boss 15 is thus inserted a predetermined depth into the boss passage hole 23, the retaining claws 16b elastically advances forward (toward the boss 15) to be returned to its original position. As a result, the boss 15 is fitted in the boss passage hole 23 in the stay 21, with four distal end portions of the boss 15 abutting respectively against four sides of the inner peripheral edge of the boss passage hole 23, and at the same time the frame portion 17 abuts against the flange 25 of the stay 21, and therefore the protector 1 is positively fixed to the stay 21. And besides, the amount of retaining engagement of the lock piece portion 16 is increased, and therefore a sufficient force of retaining of the protector 1 is obtained.

Here, the attaching operation for the protector 1 is finished.

Thus, the direction of passage of the boss 15 through the boss passage hole 23 is the direction of the normal line of the protector body 2, and therefore the protector 1 can be attached to the stay 21 even when a sliding amount is not secured in a direction along the protector body 2.

For removing the thus attached protector 1 from the vehicle-side stay 21, this operation is effected according to the following procedure.

First, the finger is brought into abutting engagement with the retaining claw 16b of the lock piece portion 16 of the protector 1, and the lock piece portion 16 is pushed rearward (away from the boss 15). As a result, the retaining claw 16b is retracted as indicated in the imaginary line in FIG. 5, so that the gap between the lock piece portion 16 and the boss 15 increases. As a result, the retaining engagement of the lock piece portion 16 with the stay 21 is canceled.

In this condition, the protector 1 is moved relative to the stay 21 in a direction of a normal line of the protector body 2, and the boss 15 of the protector 1 is withdrawn from the boss passage hole 23. At this time, the withdrawing operation for the boss 15 is easily effected since the gap between the lock piece portion 16 and the boss 15 is increased.

Then, when the finger is disengaged from the lock piece portion 16 of the protector 1, the lock claw 16b of the lock piece portion 16 elastically advances to be returned to the original position.

Here, the removal operation for the protector 1 is finished.

Thus, in contrast with the conventional slide method, the direction of withdrawing of the boss 15 from the boss passage hole 23 is the direction of the normal line of the protector body 2, and therefore the protector 1 can be removed from the stay 21 even when a sliding amount is not secured in a direction along the protector body 2.

And besides, as shown in FIG. 3, the mold removal hole 20 of a rectangular shape is formed vertically through the stay abutment plate 13 of the lock mechanism 12 in surrounding relation to the retaining claw 16b of the lock piece portion 16, and therefore even though the retaining claw 16b projects forwardly in order to increase the amount of retaining engagement of the lock piece portion 16, there is not encountered an undesirable situation in which the withdrawal molding of the protector 1 by removable (withdrawable) upper and lower molds (not shown) can not be carried out. Therefore, the protector 1 can be produced at a low cost by the withdrawal molding.

Second Embodiment

Figure 6:
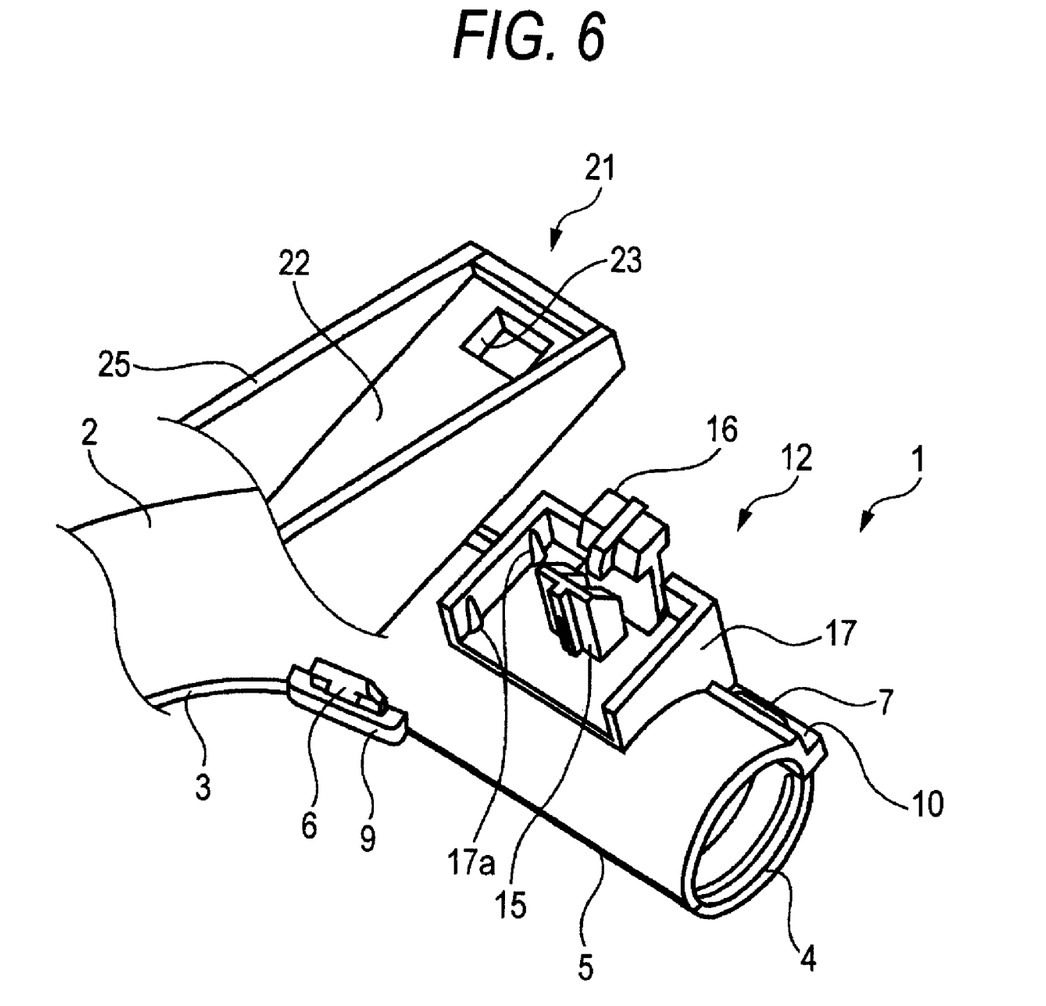
FIG. 6 is a perspective view showing a second embodiment of a protector of the invention.
Figure 7:
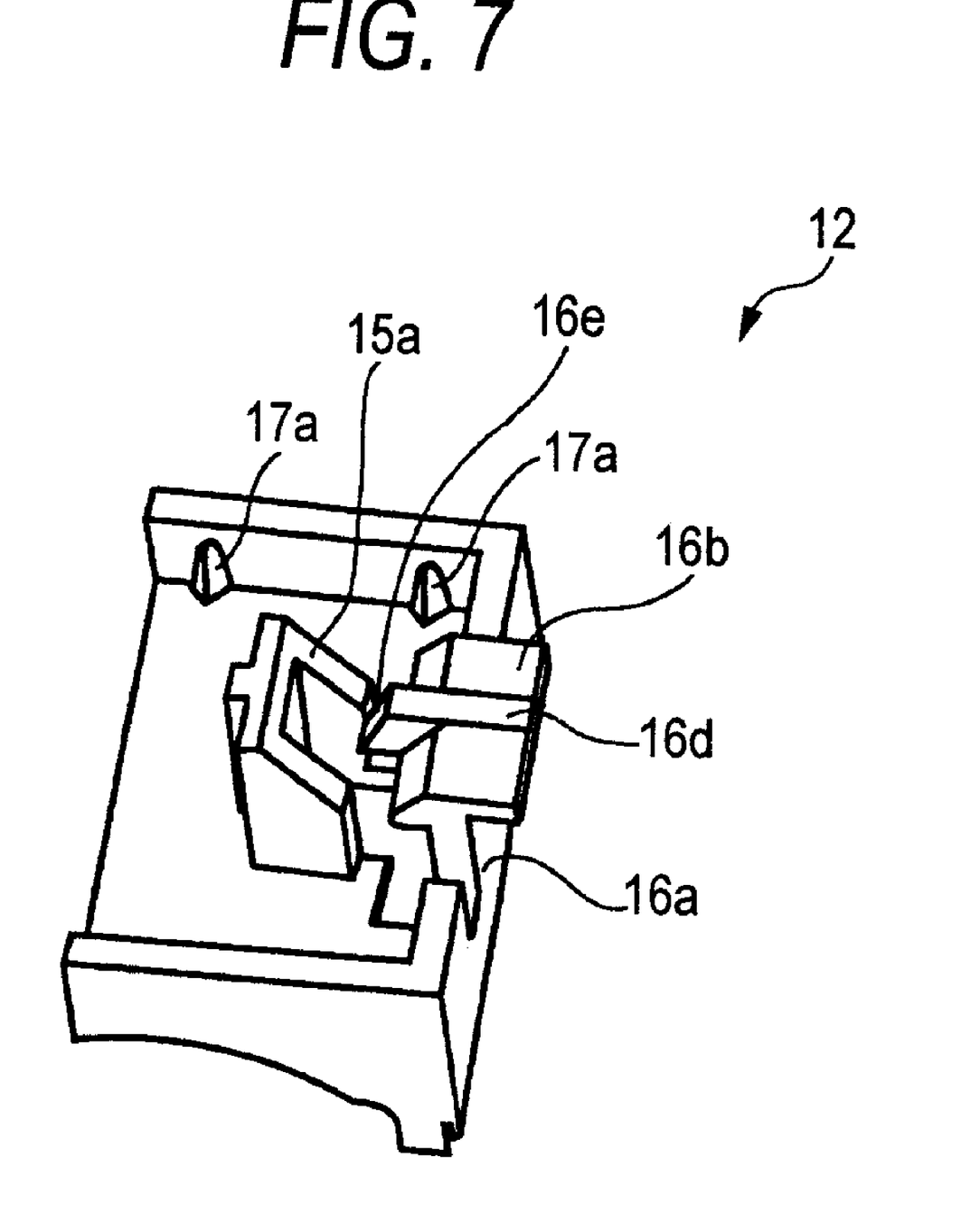
FIG. 7 is a perspective view of a lock mechanism of the protector of FIG. 6.
Figure 8:
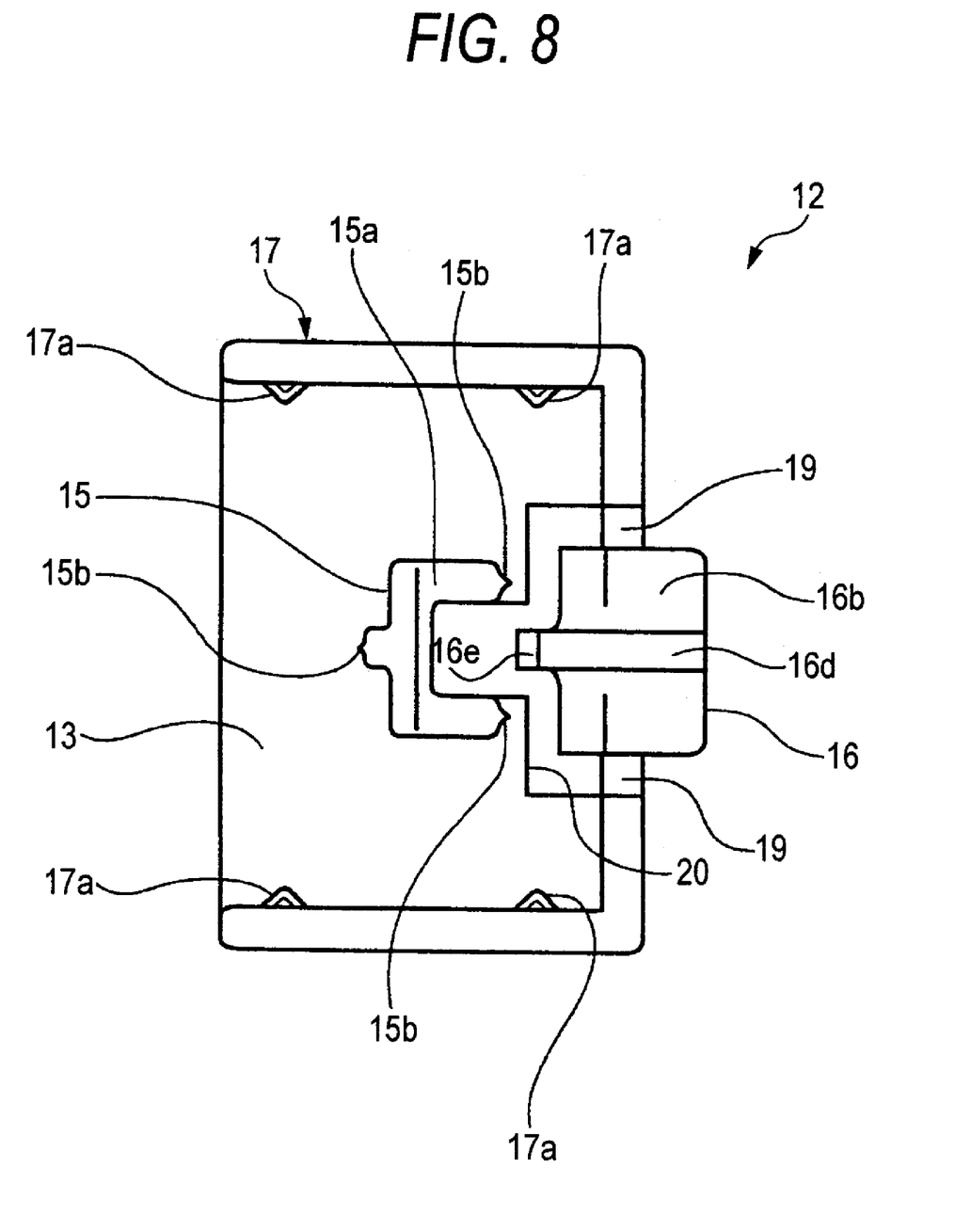
FIG. 8 is a plan view of the lock mechanism of FIG. 7.
Figure 9:
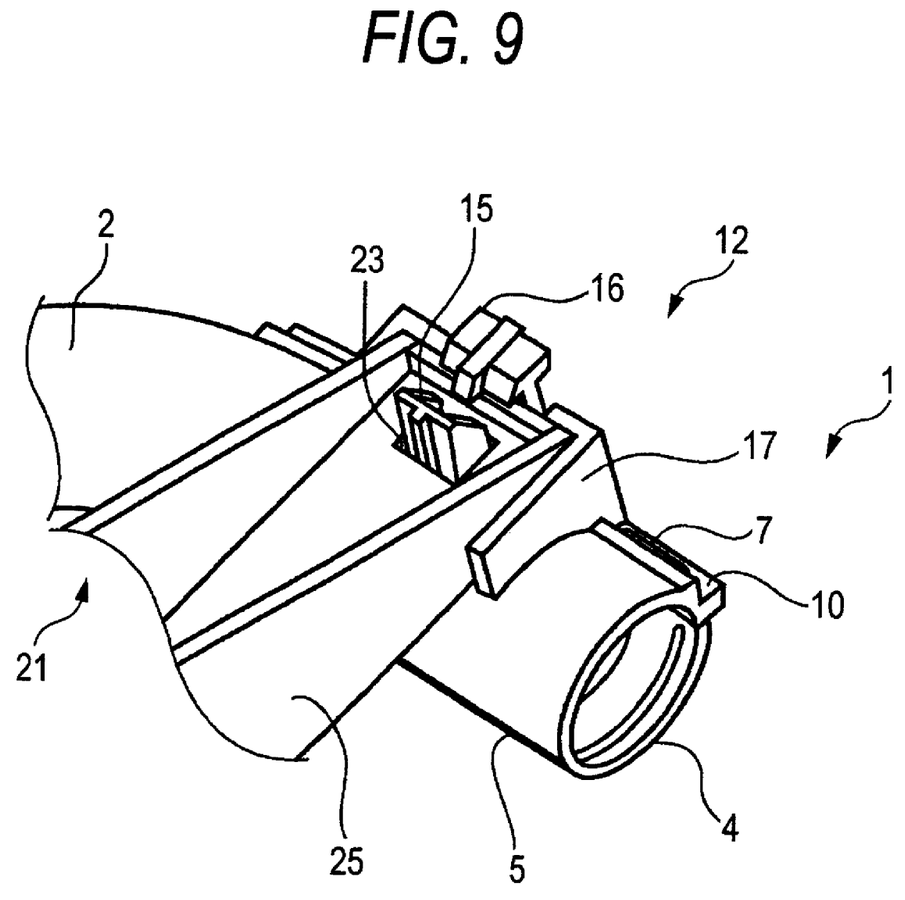
FIG. 9 is a perspective view showing a condition in which the protector of FIG. 6 is attached to a stay.
Figure 10:
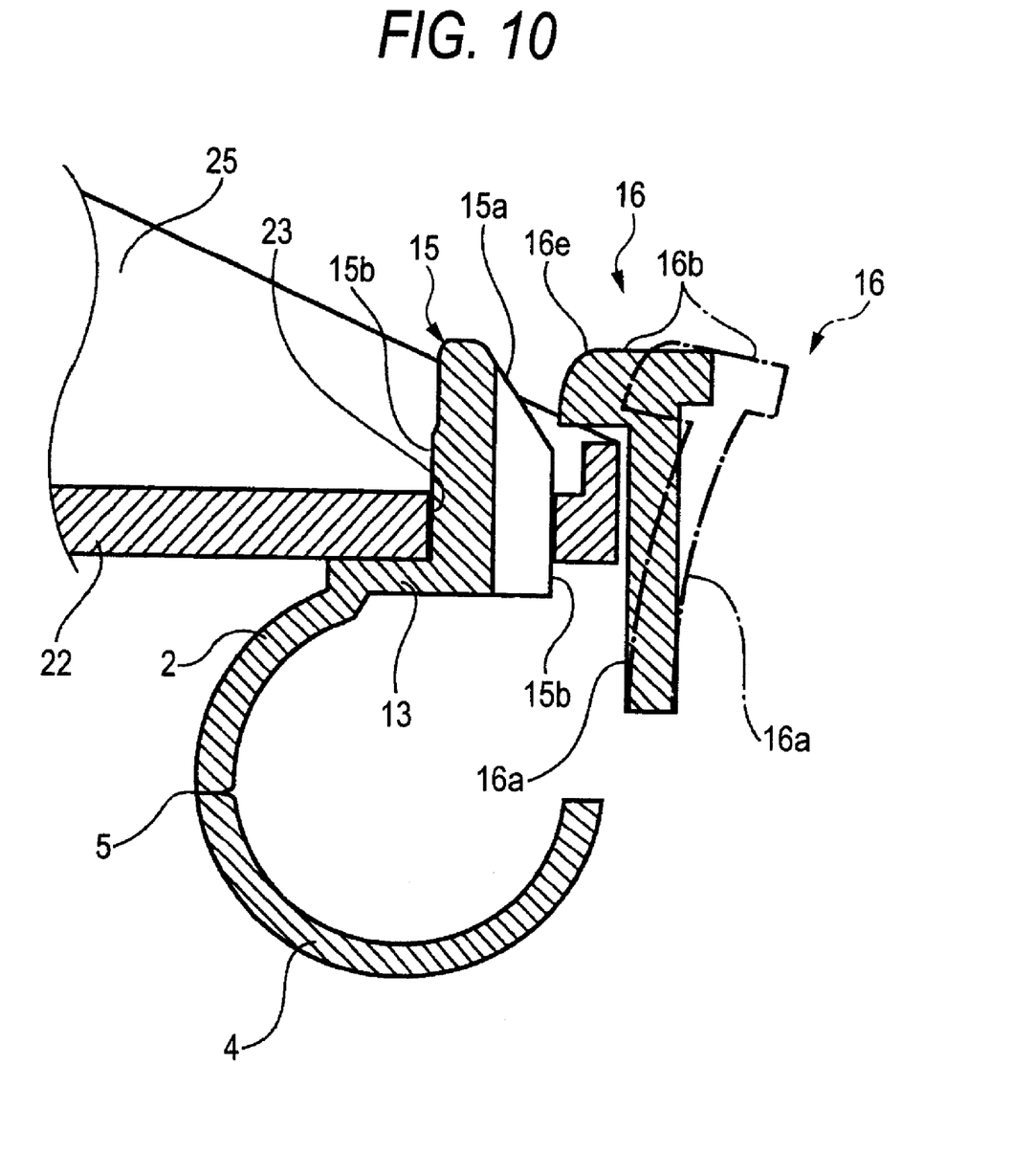
FIG. 10 is a cross-sectional view showing a condition in which the protector of FIG. 6 is attached to the stay.

FIG. 6 is a perspective view showing a second embodiment of a protector of the invention, FIG. 7 is a perspective view of a lock mechanism of the protector of FIG. 6, FIG. 8 is a plan view of the lock mechanism of FIG. 7, FIG. 9 is a perspective view showing a condition in which the protector of FIG. 6 is attached to a stay. FIG. 10 is a cross-sectional view showing a condition in which the protector of FIG. 6 is attached to the stay.

The protector 1 is an integrally-molded product made of a synthetic resin such as polypropylene and polyethylene, and this protector 1 includes a protector body 2 of a curved trough-shape as shown in FIG. 6. A first lid member 3 of an arcuate trough-shape is pivotally connected to the protector body 2 through a hinge (not shown), and a plurality of engagement claws 6 are formed on the first lid member 3. A plurality of engagement piece portions 9 are formed respectively at those portions of the protector body 2 corresponding respectively to the engagement claws 6. Further, a second lid member 4 of a straight trough-shape is pivotally connected to the protector body 2 through a hinge 5, and a plurality of engagement claws 7 are formed on the second lid member 4. A plurality of engagement piece portions 10 are formed respectively at those portions of the protector body 2 corresponding respectively to the engagement claws 7.

The lock mechanism 12 is provided at the protector body 2 as shown in FIG. 6. The lock mechanism 12 includes a flat plate-like stay abutment plate 13, a boss 15 of a generally tuning fork-shaped cross-section, a lock piece portion 16, a frame portion 17 of a generally U-shape, two grooves 19, and a mold removal hole 20 of a T-shape. The stay abutment plate 13 is perpendicular to a direction of a normal line of the protector body 2. The boss 15 is formed in an upstanding manner at a generally central portion of the stay abutment plate 13, and the upstanding frame portion 17 is disposed around the boss 15 in a manner to surround the boss 15 on three sides. The lock piece portion 16 is integrally connected to the frame portion 17, and the two grooves 19 of a predetermined depth are formed respectively at opposite sides of the lock piece portion 16. Tapering surfaces 15a are formed at an upper end of the boss 15. As shown in FIGS. 8 and 10, crushable ribs 15b of a triangular pyramid-shape are formed on the outer periphery of the boss 15 (that is, formed respectively on three distal end portions of the generally tuning fork-shaped boss body). The lock piece portion 16 has a retaining claw 16b formed integrally on an upper end of a wall-like support post 16a and projecting forwardly and rearwardly from the support post 16a. An engagement projecting portion 16d is formed on a widthwise-central portion of the retaining claw 16b, and projects forwardly from the retaining claw 16b. A tapering surface 16e is formed on an upper surface of the engagement projecting portion 16d. Further, the mold removal hole 20 is formed vertically (in an upward-downward direction) through that portion of the stay abutment plate 13 disposed beneath the retaining claw 16b and engagement projecting portion 16d of the lock piece portion 16. Four crushable ribs 17a of a triangular pyramid-shape are formed on an inner peripheral surface of the frame portion 17 as shown in FIG. 8.

On the other hand, as shown in FIG. 6, the vehicle-side stay 21 includes a flat plate-like stay body 22, and a boss passage hole 23 of a rectangular shape is formed through the stay body 22. Further, a flange 25 is formed on an outer peripheral edge of the stay body 22.

The protector 1 has the above construction, and the protector 1 is attached to the vehicle-side stay 21 according to the following procedure.

Namely, the protector 1 is moved relative to the stay 21 in a direction of a normal line of the protector body 2, and the boss 15 of the protector 1 is passed through the boss passage hole 23 in the stay 21. At this time, since the tapering surfaces 15a and the tapering surface 16e are formed respectively at the upper end of the boss 15 of the protector 1 and the upper end of the engagement projecting portion 16d of the lock piece portion 16, the lock piece portion 16 is elastically deformed as indicated in an imaginary line in FIG. 10 while the retaining claw 16b is forcibly retracted rearward (away from the boss 15) by the stay 21, so that a gap between the lock piece portion 16 and the boss 15 increases. As a result, the boss 15 is smoothly guided into the boss passage hole 23, and is passed therethrough. Incidentally, the grooves 19 are formed respectively at the opposite sides of the lock piece portion 16, and therefore the required amount of elastic deformation of the lock piece portion 16 can be secured. And besides, the engagement projecting portion 16d is formed only at part (the central portion) of the retaining claw 16b, and therefore a resistance to the passage of the boss 15 can be reduced as compared with the case where the engagement projecting portion 16d is formed over the entire width of the retaining claw 16b.

When the boss 15 is thus inserted a predetermined depth into the boss passage hole 23, the retaining claws 16b elastically advances forward (toward the boss 15) to be returned to its original position. As a result, the boss 15 is fitted in the boss passage hole 23 in the stay 21, with the three distal end portions of the boss 15 abutting against opposed two sides of the inner peripheral edge of the boss passage hole 23, and at the same time the frame portion 17 abuts against the flange 25 of the stay 21. And besides, the crushable ribs 15b disposed between the boss 15 and the inner peripheral edge of the boss passage hole 23, as well as the crushable ribs 17a disposed between the frame portion 17 and the flange 25, are crushed in accordance with the fitting operation of the boss 15, and therefore the shaking of the frame portion 17 relative to the stay 21 can be suppressed. As a result, the protector 1 is positively fixed to the stay 21. And besides, the amount of retaining engagement of the lock piece portion 16 is increased, and therefore a sufficient force of retaining of the protector 1 is obtained.

Here, the attaching operation for the protector 1 is finished.

Thus, the direction of passage of the boss 15 through the boss passage hole 23 is the direction of the normal line of the protector body 2, and therefore the protector 1 can be attached to the stay 21 even when a sliding amount is not secured in a direction along the protector body 2.

For removing the thus attached protector 1 from the vehicle-side stay 21, this operation is effected according to the following procedure.

First, the finger is brought into abutting engagement with the retaining claw 16b of the lock piece portion 16 of the protector 1, and the lock piece portion 16 is pushed rearward (away from the boss 15). As a result, the retaining claw 16b is retracted as indicated in the imaginary line in FIG. 10, so that the gap between the lock piece portion 16 and the boss 15 increases. As a result, the retaining engagement of the lock piece portion 16 with the stay 21 is canceled.

In this condition, the protector 1 is moved relative to the stay 21 in a direction of a normal line of the protector body 2, and the boss 15 of the protector 1 is withdrawn from the boss passage hole 23. At this time, the withdrawing operation for the boss 15 is easily effected since the gap between the lock piece portion 16 and the boss 15 is increased.

Then, when the finger is disengaged from the lock piece portion 16 of the protector 1, the lock claw 16b of the lock piece portion 16 elastically advances to be returned to the original position.

Here, the removal operation for the protector 1 is finished.

Thus, in contrast with the conventional slide method, the direction of withdrawing of the boss 15 from the boss passage hole 23 is the direction of the normal line of the protector body 2, and therefore the protector 1 can be removed from the stay 21 even when a sliding amount is not secured in a direction along the protector body 2.

And besides, as shown in FIG. 8, the mold removal hole 20 of the T-shape is formed vertically through the stay abutment plate 13 of the lock mechanism 12 in surrounding relation to the retaining claw 16b and engagement projecting portion 16d of the lock piece portion 16, and therefore even though the engagement projecting portion 16d projects forwardly from the retaining claw 16b in order to increase the amount of retaining engagement of the lock piece portion 16, there is not encountered an undesirable situation in which the withdrawal molding of the protector by removable (withdrawal) upper and lower molds (not shown) can not be carried out. Therefore, the protector 1 can be produced at a low cost by the withdrawal molding.

Third Embodiment

Figure 11:
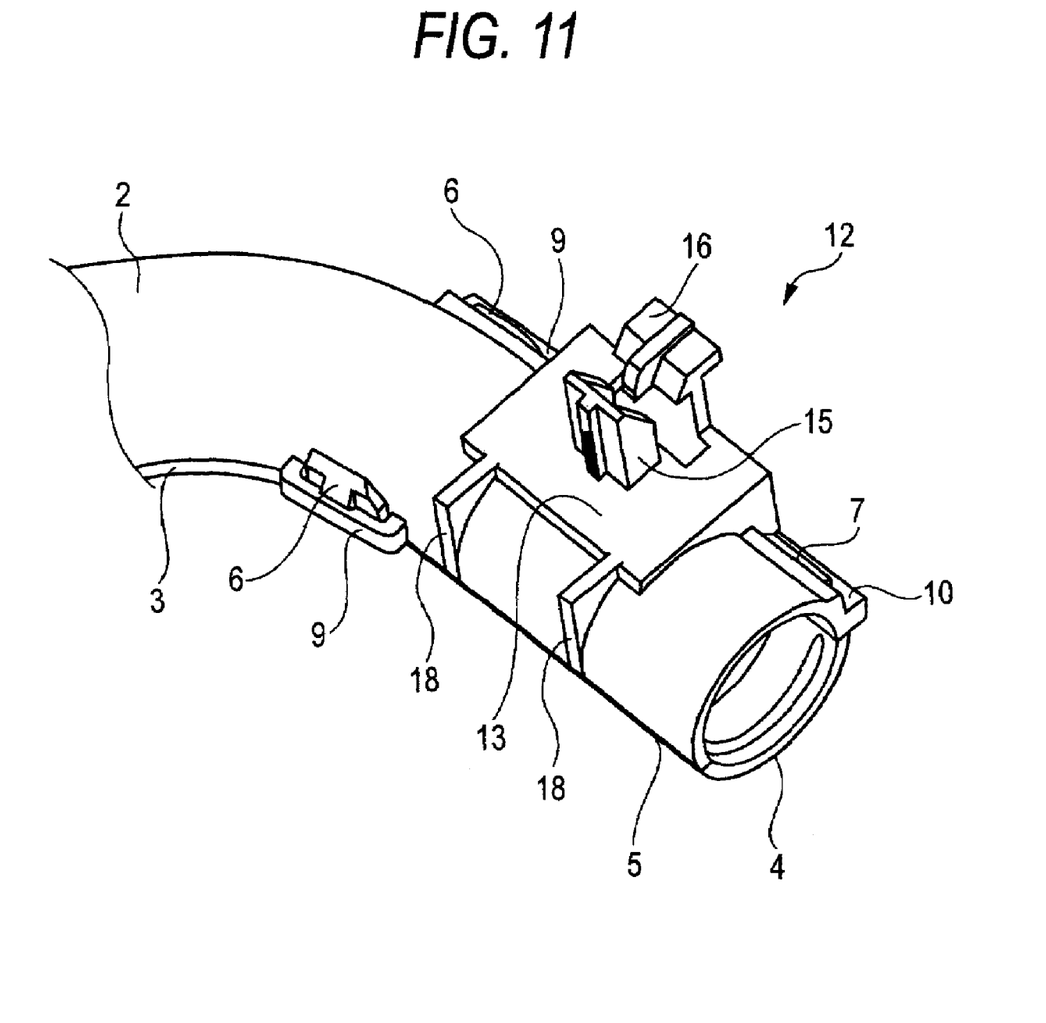
FIG. 11 is a perspective view showing a third embodiment of a protector of the invention.
Figure 12:
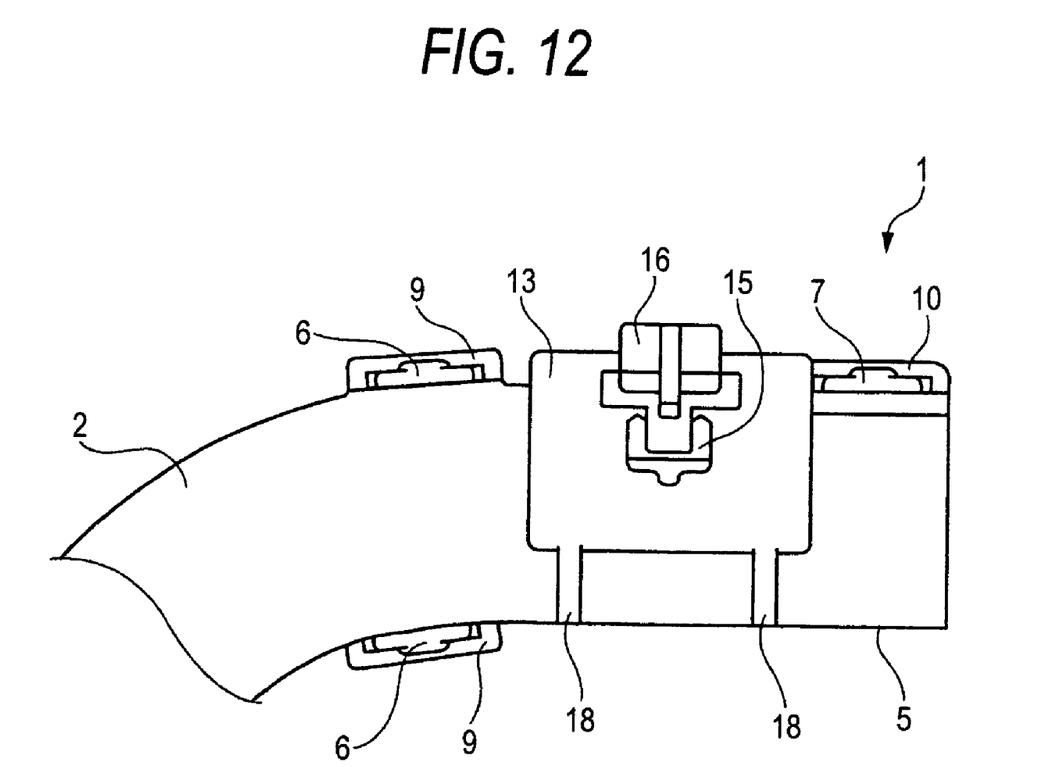
FIG. 12 is a plan view of the protector of FIG. 11.

FIG. 11 is a perspective view showing a third embodiment of a protector of the invention, and FIG. 12 is a plan view of the protector of FIG. 11.

Although the lock mechanism 12 of each of the above embodiments has the generally U-shaped frame portion 17 provided in an upstanding manner around the boss 15, the provision of the frame portion 17 can be omitted as shown in FIGS. 11 and 12. In this case, the frame portion 17 is not provided around the boss 15, and therefore only the boss passage hole 23 need to be formed through a predetermined portion of a vehicle side stay 21, and any other limitation is not imposed on the configuration of the stay 21. As a result, the versatility of the protector 1 is enhanced.

Further, a pair of shaking prevention ribs 18 having upper edges disposed flush with a stay abutment plate 13 may be formed on a protector body 2 as shown in FIGS. 11 and 12. In this case, when the protector 1 is attached to the stay 21, the areas of supporting of the protector 1 by the stay 21 increase, and therefore the shaking of the protector 1 can be suppressed.

Other Embodiment

In the above embodiments, although the retaining claw 16*b* projects rearwardly from the support post 16*a* of the lock piece portion 16, the retaining claw 16*b* may be formed into any other suitable shape in so far as the finger can be brought into abutting engagement with the retaining claw 16*b* so as to elastically deform the lock piece portion 16 rearwardly at the time of removing the protector 1 from the vehicle-side stay 21. Furthermore, the provision of the rearwardly-projecting portion of the retaining claw 16*b* can be omitted.

The present invention can be extensively applied to various fields of industry such as an automobile, an airplane, train, a manufacturing plant, electric appliances and an electric office equipment.

What is claimed is:

1. A protector comprising:
   a protector body; and
   a lock mechanism for a stay provided at the protector body, the lock mechanism including:
   a stay abutment plate which is tangential to said protector body;
   a boss projected from the stay abutment plate for passing through a boss passage hole in said stay; and
   a lock piece portion for locking the lock mechanism with said stay.

2. A protector according to claim 1, wherein said lock piece portion has a retaining claw projecting toward said boss.

3. A protector according to claim 2, wherein said lock piece portion has an engagement projecting portion projecting from said retaining claw toward said boss.

4. A protector according to claim 3, wherein said engagement projecting portion is formed at part of said retaining claw.

5. A protector according to claim 1, wherein a crushable rib is formed on an outer periphery of said boss.

6. A protector according to claim 1, wherein a frame portion for snugly fitting to said stay is formed around said boss.

7. A protector according to claim 6, wherein a crushable rib is formed on an inner periphery of said frame portion.

\* \* \* \* \*